Nov. 30, 1965    H. HUNGER    3,220,327
ADAPTER LAMP FOR USE WITH UNDERWATER TELEVISION CAMERAS
Filed Nov. 9, 1961
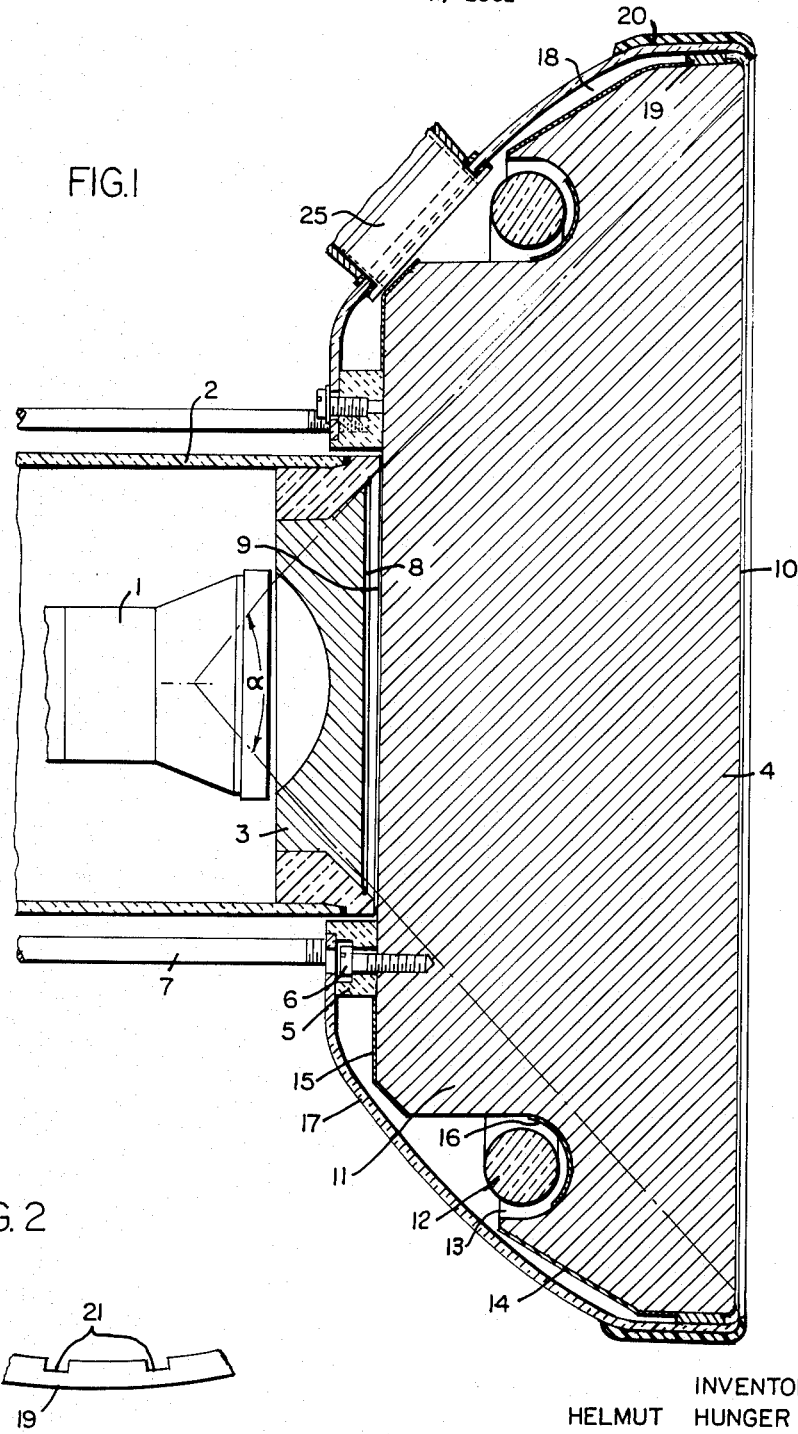
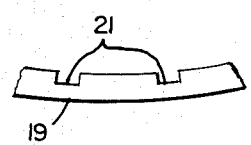
INVENTOR:
HELMUT HUNGER
BY,
Wolf, Greenfield & Hueken
ATTORNEYS United States Patent Office 3,220,327
Patented Nov. 30, 1965

3,220,327
ADAPTER LAMP FOR USE WITH UNDER-
WATER TELEVISION CAMERAS
Helmut Hunger, Fischereihafen Geb. 12, Kiel, Germany
Filed Nov. 9, 1961, Ser. No. 151,401
9 Claims. (Cl. 95—11.5)

When using underwater television cameras or movable cameras for illuminating an object under observation, it is known to use an adapter which is equipped with a source of light to render clear viewing under light-pure conditions.

According to the present invention a favorable improvement will be achieved, if the light source consists of one or more lamps arranged in such a manner that they encircle the sight of field of the camera lens like a ring. In constructing the adapter lamp use is made of a light permeable material on which light reflecting layers are deposited producing an even illumination and clear viewing of the respective object under observation. An incandescent lamp, a fluorescent gas or the like may be used as lighting medium. It is preferred, however, to use for television cameras a lamp with continuous light output and for moving cameras such with intermittent flash-light. Nevertheless, for a television camera there may be used also an intermittent lighting in synchronism with the change of picture patterns, for instance between 25 to 50 flashes per second.

According to the present invention it is preferred to arrange one or more ring-shaped lamps in such a manner that their position does not interfere with the reflected light coming from the object under observation, however, it is arranged so that by using light reflecting means an even and intensive illumination of the object can be obtained. When using the adapter lamp together with a television camera or moving camera, the reflector means above referred to will improve the illumination of the object considerably.

In the actual construction and as a part of the adapter lamp a light permeable material is provided as a solid body in which grooves are provided to accommodate the source of light which grooves are beyond the range of sight of the camera lens.

To obtain as high a light output as possible, in practice it is useful to dim the lamp by dimming means toward the part of light permeable material facing the object, so that the intensity of illumination produced by direct and indirect radiation is about the same. In this case the dimming means may consist of semi-translucent material, so that the partly reflected or permeated light rays will contribute to a better lighting effect on the object.

In order to make the invention clearly understood, reference will now be made to the accompanying drawings, in which—

FIG. 1 shows an adapter lamp according to the invention secured to a camera in sectional view taken in axial direction, FIG. 2 is a fragmentary, enlarged front view of a ring element of this invention.

The embodiment as shown in FIG. 1 shows the front part of an underwater camera with lens 1, the housing 2 of the camera and a window 3, positioned in front of the camera lens 1. Window 3 which may be made of glass or perspex of high light permeability is shaped to allow the reflected light rays within the viewing angle of the camera lens to reach the same. The surface of window 3 facing the camera lens is further shaped concavely to influence the direction of the light rays. It is to be noted that the concave surface of window 3 facing lens 1 and the opposite surface of window 3 facing the object under observation are of highly polished nature to render the undisturbed light admission most effectively. Under window 3 is positioned a solid light permeable material 4 which may be made of glass or perspex having high light permeability and which further adjoins the even outside surface of window 3. To this top surface of the solid body 4 a flange 5 is secured by plurality of screws 6 which further accepts vertical studs 7 for securing the same to the camera housing 2 (not shown). The space 8 between window 3 and the light permeable material is filled with liquid which may be of the anti-frost nature.

The viewing angle α of the camera lens 1 which is usually between 80 to 110° is further maintained by shaping the light permeable body in such a manner that the surface which is in contact with the muddy water is evenly flat and provides ample clearance for the light rays entering into solid body 4 within the above said range of α. The water side surface 10 of body 4 is made in such a shape that light rays entering into the permeable material on its edges will not cause any distortion to the image shown on the television screen.

The inner and outer walls 9 and 10 respectively of the light permeable body 4 which are within the range of the viewing angle α are even. To receive lamp 12 there is provided a groove 13 on the back side of the body 4 lying beyond the range of α. This groove has a circular bottom, part of which is coated with a semi-translucent light reflecting layer 16. The part of the lamp 12 facing the water side surface 10 of body 4 is dimmed by the above mentioned reflecting layer 16 in such a manner that light rays will be partly emitted toward the surface 10 and light rays will be reflected also from semi-translucent light reflecting layers 14 and 15 deposited on side walls of body 4, so that the intensity of direct and indirect radiation is about the same. Thus, part of the light rays is directed through layer 16 directly to surface 10, while the reflecting layers 14 and 15 reflect the rays from the ring-shaped lamp 12 indirectly towards the surface 10 of body 4.

Body 4 is enclosed by means of protecting shield 17 in such a way that between shield 17 and body 4 there is a space 18. The inner wall of shield 17 is secured to flange 5 of body 4, while the outer wall encloses the rim of body 4. Close to the water side of body 4 and between the enclosing edge of protecting shield 17 there is provided a distance ring 19 of plastic material to hold shield 17 at a certain distance from body 4. The inner wall of protecting shield 17 is coated with a light reflecting medium in order to direct especially those rays which are coming from the coated part of groove 13 toward the water side surface 10 of the light-permeable material 4.

An outer ring 20 preferably of plastic material is provided on the periphery of protecting shield 17. The purpose of this ring is to stiffen the enclosing edge of the shield and also to protect the glass or perspex body 4 by means of its protruding edge. When an object with uneven surface is to be observed, in order to prevent damage to the body 4 when the camera is moved from one spot to another, it is particularly useful to provide the outer ring 20 with a protrusion of approximately 20 to 30 mm. over body 4. If the outer ring 20 is fastened inflexible, then there would be the disadvantage that there is 20 to 30 mm. muddy water between the object and the glass or perspex body 4, and the picture received could not show clear features of the object under observation. Therefore, it is advantageous to spring-mount a heavier ring, so that on moving the camera, the ring will keep the body 4 away from the uneven surface, when using the above adapter arrangement in a stand-still position and a comparatively even surface is to be observed, then body 4 can be pressed close to the object.

The space 18 provided between protecting shield 17 and light permeable body 4 may be filled by clear water through inlet part 25 connected to a clear-water supply (not shown). When the adapter lamp arrangement is submerged in muddy water by supplying the clean water through inlet part 25, it will displace the muddy water accumulated between protecting shield 17 and body 4 and further flows in the gap provided between the periphery of body 4 and protecting shield 17 and by its continuous flow the muddy water is driven off which was in front of the surface 10, and thus a clear medium is provided between object and light permeable material 4 to enable a clear representation of image on the television screen. To allow a continuous flow of clean water, ring 19 is provided with slots such as 21 through which the continuous flow of clean water into the surrounding medium of muddy water is maintained. The flow of clean water further results in an effective cooling of the ring-shaped lamp 12.

The arrangement described above may be used in horizontal position, however, it often happens that vertical or inclined planes of objects should be observed. Therefore it is advisable to provide indicating means on the light permeable body in the range of the viewing angle of the lens to indicate on the television screen the momentary position of the adapter lamp arrangement relative to the vertical plane.

What I claim is:

1. In combination an underwater camera having a lens defining a viewing angle and a clear-view adapter lamp mounted in front of a lens of said camera which is to be immersed in a fluid,
    said lamp comprising a solid body of a light permeable material having an outer peripheral encircling wall and an outer forward wall,
    said solid body being dimensioned so as to extend laterally beyond said viewing angle of a camera lens with which the adapter is used,
    an illumination means encircling and mounted within a groove provided in said outer peripheral wall so that said illumination means lies outside of and around said viewing angle, and
    means encircling said peripheral encircling wall for providing clear view through said solid body to said camera lens with which said adapter is used.

2. A combination in accordance with claim 1 wherein said illumination means comprises a tubular lamp positioned so as to illuminate said outer peripheral encircling wall, said outer peripheral encircling wall carrying means for reflection of light waves through said forward outer wall.

3. A combination in accordance with claim 2 wherein said tubular lamp additionally is positioned so as to illuminate directly said outer forward wall so that direct and reflected light waves passing through said forward outer wall are of equal intensity.

4. A combination in accordance with claim 2 wherein an encircling protective shield is provided spaced from said outer peripheral wall and defining therewith a fluid passageway comprising said means for providing a clear view through said solid body.

5. A combination in accordance with claim 2 wherein said outer encircling wall is coated with a light reflecting medium.

6. A combination in accordance with claim 4 wherein a protecting ring encloses the periphery of said protecting shield and extends outwardly of said forward outer wall to provide a stop for said lamp and enable said lamp to be positioned in contact with a surface to be viewed while preventing said outer forward wall from directly engaging said surface.

7. A clear-view adapter lamp in accordance with claim 4 wherein means are provided positioned between said solid body and said protective shield for providing fluid circulation in front of said forward viewing wall.

8. In combination and underwater camera having a lens defining a viewing angle and a clear-view adapter lamp attached in front of said under water camera,
    said clear-view adapter lamp comprising a solid body of a light permeable material,
    said solid body defining an outer forward wall, a conical outer peripheral wall and a groove in said peripheral wall carrying illumination means surrounding said solid body and located outside of said viewing angle,
    a portion of said groove surrounding said solid body carrying a semi-translucent light reflecting layer constructed and arranged to allow passage of some light to said outer forward wall and reflect some light to said conical outer peripheral wall,
    said conical outer peripheral wall carrying light reflecting means for reflecting light from said illuminating means to a portion of said outer forward wall lying within said viewing angle.

9. A combination in accordance with claim 8 in which an outer rear wall is provided substantially parallel to said forward wall and carrying light reflecting means for reflecting light from said illumination means to said forward wall at a portion of said forward wall within said viewing angle.

References Cited by the Examiner

UNITED STATES PATENTS

| | | | |
|---|---|---|---|
| 825,241 | 7/1906 | Pino. | |
| 1,888,995 | 11/1932 | Matter. | |
| 2,295,046 | 9/1942 | Noel | 240—11.4 |
| 2,490,370 | 12/1949 | Neuwirth | 240—1.3 X |
| 2,501,405 | 3/1950 | Noel | 240—1.3 |
| 2,758,196 | 8/1956 | Greppin | 240—1.3 |
| 2,763,772 | 9/1956 | Hine | 240—1.3 |
| 2,872,567 | 2/1959 | Strange | 240—1 X |
| 2,982,191 | 5/1961 | Laual | 95—11 |
| 2,995,992 | 8/1961 | Merritt | 95—11 |

FOREIGN PATENTS

| | | |
|---|---|---|
| 138,374 | 8/1950 | Australia. |
| 952,918 | 11/1956 | Germany. |

NORTON ANSHER, *Primary Examiner.*